United States Patent
Patel et al.

(10) Patent No.: US 9,747,289 B2
(45) Date of Patent: Aug. 29, 2017

(54) SYSTEM AND METHOD FOR PROXIMITY-BASED PERSONALIZED CONTENT RECOMMENDATIONS

(71) Applicant: Disney Enterprises, Inc., Burbank, CA (US)

(72) Inventors: Mehul Patel, Stevenson Ranch, CA (US); Mark Arana, Agoura Hills, CA (US); Tony R. Smith, Sherman Oaks, CA (US); Alexander C. Chen, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/994,408

(22) Filed: Jan. 13, 2016

(65) Prior Publication Data

US 2017/0199874 A1    Jul. 13, 2017

(51) Int. Cl.
*G06F 3/00* (2006.01)
*G06F 17/30* (2006.01)
*H04W 4/02* (2009.01)
*G06F 3/048* (2013.01)

(52) U.S. Cl.
CPC .... *G06F 17/30041* (2013.01); *G06F 17/3005* (2013.01); *H04W 4/023* (2013.01)

(58) Field of Classification Search
CPC ........ G06F 17/30029; G06F 17/30035; H04N 21/466; H04N 21/4668; H04N 21/4826
USPC ............................................. 715/738; 725/43
See application file for complete search history.

(56) References Cited

U.S. PATENT DOCUMENTS

| 7,877,387 | B2  | 1/2011  | Hangartner |
| 8,402,493 | B2  | 3/2013  | Roewe |
| 8,640,021 | B2  | 1/2014  | Perez et al. |
| 8,849,199 | B2  | 9/2014  | Shrum, Jr. et al. |
| 8,856,833 | B2  | 10/2014 | Conness et al. |
| 8,949,871 | B2  | 2/2015  | Chai et al. |
| 9,021,370 | B1  | 4/2015  | Carlson |
| 9,094,722 | B2  | 7/2015  | Phillips et al. |
| 9,106,958 | B2  | 8/2015  | El Kaliouby et al. |
| 2008/0301149 | A1* | 12/2008 | Malcolm ........... G06F 17/30035 |
| 2010/0088649 | A1  | 4/2010  | Kemp |
| 2012/0159337 | A1* | 6/2012  | Travilla ............. G06Q 30/0631 715/738 |
| 2012/0180107 | A1  | 7/2012  | Gammill et al. |
| 2013/0031162 | A1  | 1/2013  | Willis et al. |
| 2013/0066936 | A1  | 3/2013  | Krishnan et al. |
| 2013/0238710 | A1  | 9/2013  | Meshulam et al. |

(Continued)

OTHER PUBLICATIONS

Gartrell, SocialAware: Context-Aware Multimedia Presentation via Mobile Social Networks, 2000, pp. 1-42.

(Continued)

*Primary Examiner* — Lee Nguyen
(74) *Attorney, Agent, or Firm* — Sheppard, Mullin, Richter & Hampton LLP

(57) ABSTRACT

Systems and methods for generating and outputting personalized content recommendations are provided. When it is determined that two or more users are in close proximity to each other, the two or more users' respective media content libraries may be compared. Commonalities or related aspects of the two or more users' respective media content libraries can be determined and leveraged to generated personalized content recommendations.

20 Claims, 7 Drawing Sheets

(56) References Cited

U.S. PATENT DOCUMENTS

| | | |
|---|---|---|
| 2013/0332962 A1 | 12/2013 | Moritz et al. |
| 2014/0258027 A1 | 9/2014 | Veugen |
| 2014/0380359 A1 | 12/2014 | Musil et al. |
| 2015/0066915 A1 | 3/2015 | Golder et al. |
| 2015/0135225 A1 | 5/2015 | Bayer et al. |
| 2016/0029085 A1* | 1/2016 | Mountain .......... H04N 21/4583 725/43 |
| 2016/0316248 A1* | 10/2016 | Hao ................. H04N 21/41407 |

OTHER PUBLICATIONS

Kim et al, A stochastic approach to group recommendations in social media systems, Elsevier Ltd., Oct. 18, 2014, pp. 76-93.
Slideshare, Context-aware Media Personalization: Better Recommendations Through Context, http://www.slideshare.net/sentiance/contextaware-media-personalization-better-recommendations-through-context, accessed Sep. 2, 2016.

* cited by examiner

SYSTEM AND METHOD FOR PROXIMITY-BASED PERSONALIZED CONTENT RECOMMENDATIONS

TECHNICAL FIELD

The present disclosure relates generally to media content recommendation.

DESCRIPTION OF THE RELATED ART

Broadcasting can refer to the distribution of media content (e.g., audio, video, etc.) to a dispersed audience via some mass communications medium. The mass communications medium may be a cable network, a data network, radio waves, and the like. Digital distribution can refer to the delivery of media content without the use of physical media. Digital distribution has become popular due to advances in computer networking and communication technologies.

BRIEF SUMMARY OF THE DISCLOSURE

In accordance with one embodiment of the present disclosure, a computer-implemented method comprises determining whether a first user is proximate to a second user. The computer-implemented method further comprises providing a recommendation of media content to consume based on one or more characteristics associated with the first and second users.

In accordance with another embodiment of the present disclosure, an apparatus comprises a processor and a memory unit operatively connected to the processor. The memory unit includes computer code adapted to cause the processor to: receive at least one of active and passive input from a plurality of users proximate to each other; receive at least one of temporal input indicative of a current time and environmental input indicative of an environment in which the plurality of users are currently present; determine at least one of common and related aspects of the at least one of the active, passive temporal, and environmental inputs relative to one or more media contents comprising respective media libraries of each of the plurality of users; and output at least one recommendation for the one or more media contents based upon the at least one of common and related aspects.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
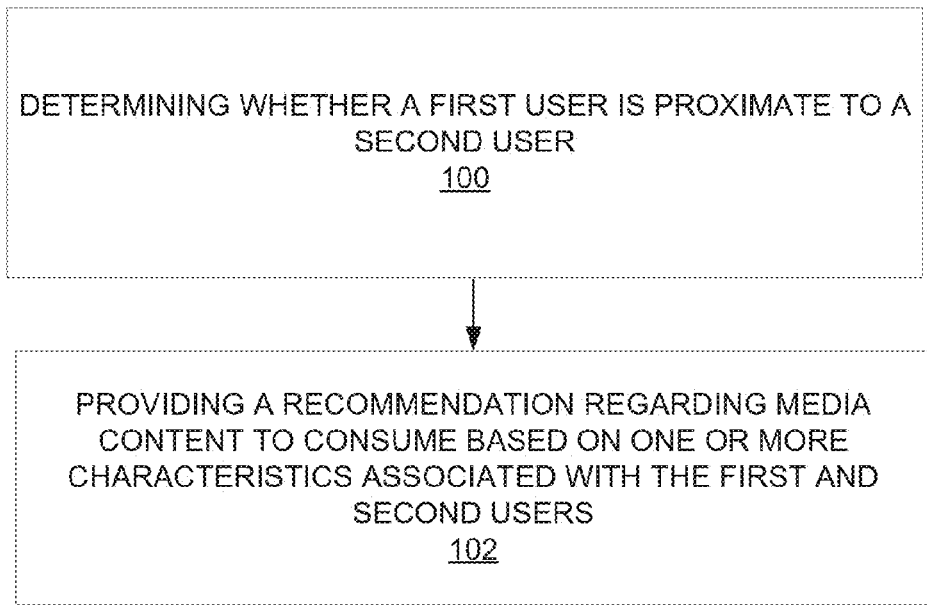
FIG. 1A is an operational flow diagram illustrating an example process for personalized content recommendations in accordance with various embodiments.

The figures are not exhaustive and do not limit the present disclosure to the precise form disclosed.

DETAILED DESCRIPTION

As previously discussed, digital distribution has become popular due to advances in computer networking and communication technologies. One example of digital distribution involves a server downloading or streaming non-linear media content to a user device over a data network, such as the Internet. Streaming media access or downloadable media content can be provided by traditional broadcasting entities, third-party media content providers, studios that create and/or produce media content, etc. In some instances, a user may pay a monthly fee for a subscription to a media content service provided by a media content provider. The user may then access media content in the media content provider's media content library to download or stream to a user device. For example, the user can utilize a client media player, media presentation application, web browser, etc. that can connect to and access desired media content from, e.g., a server hosted by the media content provider. A user may also rent media content by paying a fee to access the desired media content from a media content provider for some predetermined amount of time, or a user may purchase the media content outright for a fee. A user may also have the ability to create or generate his/her own library of media content. It should be noted that media content in accordance with various embodiments may include, but is not limited to digital music, movies, TV shows, pictures, eBooks, audio books, video games, etc. Although various embodiments disclosed herein are directed to media content that is provided by some content provider such as a broadcasting entity, media content can also be provided by users, e.g., digital videos taken by users themselves.

The aforementioned systems and methods of digitally distributing media content are premised upon a single user, subscriber, or entity having access to the media content. Sharing of media content may be difficult due to digital rights managements (DRM) restrictions that may be associated with the media content. Moreover, deciding which media content to consume, for example, can be a laborious process when two or more users are involved.

Therefore, various embodiments described herein provide systems and methods for personalized content recommendations between two or more users. Accordingly, when two (or more) users are proximate to each other, the users may be associated, "bound" or paired together such that one or both users may be presented with one or more recommendations for media content. Once selected, media content can be presented by a user device associated with the user having rights to present or consume the media content, or temporary access can be granted to that user's digital media content on a second user's device. In determining personalized content recommendations, the analysis of factors including, but not limited to the environment in which the two or more users are current present, the time, commonalities between the two or more users regarding their respective media content libraries, media content preferences, history, and the like, can also be applied to targeted advertising and content discovery.

FIG. 1A is an operational flow chart illustrating example processes performed for providing content recommendations when two or more users are proximate to each other in accordance with various embodiments. At operation 100, a determination is made regarding whether a first user is proximate to a second user. This determination can be made based upon information gleaned from location-based services (described below and illustrated in FIG. 3), or a discovery protocol through which user devices associated with the first and second users broadcast and/or receive messages or indications of the first and second users' media content application ID, user device IP address, etc. Still other methods of determining proximity can involve cameras or sensors associated with user devices that can be leveraged to determine the presence of two or more users at a location, as well as determining users on a given network or network subnet, determining users accessing a particular WiFi router, and/or determining users via personal identifiers, such as RFIDs and Bluetooth IDs.

Figure 2A:
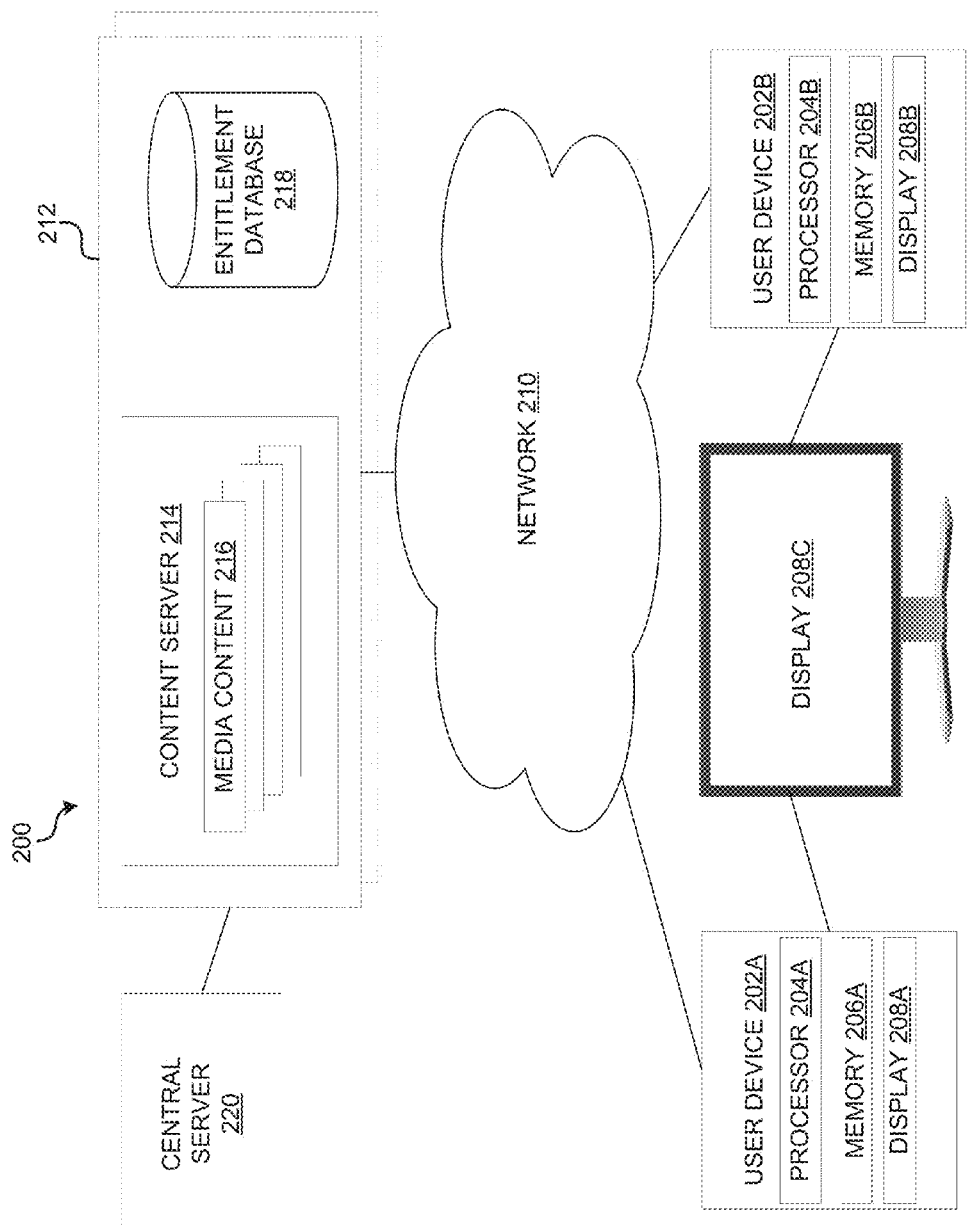
FIG. 2A illustrates an example environment in which various embodiments may be implemented.

As illustrated in FIG. 2A, system 200 can include a first user device 202A. First user device 202A may include a processor 204A, a memory unit 206A, a display 208A, and can be configured to store downloaded digital media content, stream digital media content, etc. for presentation on display 208A or a separate or stand-alone display, e.g., display 208C. First user device 202A may be a DVR, a cable/satellite/internet protocol television (IPTV)/over-the-top (OTT) set-top box, a gaming console, a tablet personal computer (PC), a smart phone, a laptop PC, etc. Display 208C may be a TV, monitor, or other presentation/media content consumption apparatus. First user device 202A may be associated with a first user, where the first user has a subscription or account with a media content service through which media content can be provided by content provider 212. The first user may have purchased, rented, or subscribed to one or more media content. Thus, the first user may have a first media content library comprising that purchased, rented, or subscription media content.

System 200 can also include a second user device 202B. Like first user device 202A, second user device 202B may include a processor 204B, a memory unit 206B, a display 208B, and can be configured to store downloaded digital media content, stream digital media content, etc. for presentation on display 208B or a separate display, e.g., display 208C. Second user device 202B may be a digital video recorder (DVR), a cable/satellite/internet protocol television (IPTV)/over-the-top (OTT) set-top box, a gaming console, a tablet personal computer (PC), a smart phone, a laptop PC, etc. Second user device 202B may be associated with a second user, where the second user may have a subscription or account with the same media content service. The second user may have his/her own library of media content that the second user has subscribed to, purchased, or rented from content provider 212.

In some embodiments, one or more of user devices 202A or 202B may be a wearable identification device, such as a watch, an ID band, glasses, etc. In some embodiments, the user devices 202A or 202B may belong to a user, i.e., the user's personal device, or may be provided by some other entity, such as a media content provider. It should be noted that first and second user devices 202A and 202B need not be the same type of device. That is, and in accordance with one example scenario, first user device 202A may be a smartphone, and second user device 202B may be a wearable identification device.

System 200 may further include one or more media content providers 212, which may be a broadcast entity, such as a television broadcast network entity (e.g., ABC), a cable provider (e.g., COMCAST®), or any other digital media content distributor, such as Amazon®, iTunes®, Netflix® or other third-party distributor of media content. Content provider 212 may include a content server 214 on which digital media content 216 can be stored, along with any required entitlements, other entitlement information, DRM licenses, etc. which can be maintained in entitlement database 218.

System 200, in accordance with some embodiments, may further include a central server 220 that can act as a unifying entity that can bind or associate users across providers, networks, etc., such as multiple media content providers. That is, central server 220 can provide personalized content recommendations (as well as content sharing) between, e.g., two or more distinct content providers. For example, users need not subscribe to the same media content provider service in order to share content and/or receive personalized content recommendations when in proximity to each other in accordance with various embodiments.

It should be noted that one or more licenses or temporary licenses can be created, utilized, and/or transferred to the appropriate entities in accordance with various embodiments. Such licenses can be configured to account for varying levels of access and/or distribution, time limits, usage limits, and can be partitioned if need be. For example, in accordance with one of the aforementioned scenarios, media content provider 212 may provide a temporary license to an instance of media content. In this way, user device 202B may have the ability to present media content belonging to or rented by a first user associated with user device 202A.

Network 210 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 210 may employ various communication media, such as a coaxial cable, fiber optic cable system, Ethernet, radio waves, etc. Further still, network 210 may be one or more combinations of any of the aforementioned networks.

The first and second users may be paired upon a determination of proximity. Pairing of the first and second users may entail one or more of the following: pairing of their respective media content libraries, pairing of their respective accounts, pairing of their respective user devices, temporary granting of entitlements, etc. It should be noted that operation 102 is optional. For example, the first or second user may be allowed access to the other user's media content library without "pairing" having to occur vis-à-vis 1-way sharing.

In one example, both the first and second users may be logged into their respective media content service accounts. Upon coming into close proximity to each other, the first and second user devices 202A and 202B may exchange the first and second user's respective media content service IDs, where the respective IDs are associated with media content service applications running on the first and second user devices 202A and 202B. This can occur, for example, if the first user visits the second user's home, and the first user device 202A may receive a message or indication broadcast by the second user device 202B containing the second user's media service application user ID. It should be understood that the first user device 202A may be engaged in a commensurate scanning operation to receive the broadcast message or indication. This can be achieved using some form of discovery protocol or schema.

It should also be understood that although various embodiments are described in the context of a media content service ID exchange or discovery, pairing can be accomplished based on, but not limited to the following: recognizing the first and/or second user's known Internet Protocol (IP) address(es) associated with his/her device; a recognition that at least some media content within the first and second user's media content library overlaps; and an application ID identifying the instance of the media content service application that is running on the users' devices. Moreover, the exchange of the first and second user's respective media content service IDs can occur at the media content provider 212 and/or central server 220. That is, user device 202A and user device 202B do not have to be involved in this exchange, and the exchange can be performed without a priori knowledge of accounts, identities, etc., on the part of the first and second users.

Ultimately, the first and second users may be bound with regard to their respective media content libraries, such that one or more personalized content recommendations can be provided based on one or more aspects of the respective media content libraries. For example, personalized content recommendations can take into account common aspects of each users' media content library, such as commonly owned/rented movies, common genres, common performers, as well as common, recently consumed content.

It should be noted that the degree of proximity required for binding the first and second users may vary. The requisite proximity may be achieved, as alluded to above, by virtue of the first user visiting the second user's home and the first and second user devices 202A and 202B recognizing the first and second user's respective media service application IDs. Hence, a proximity determination may be based on some general geographic location or range. For example, first user device 202A may be the first user's smartphone, while device 202B may be the second user's set-top box, home PC, network-connected media system, etc. In other embodiments, as will be described in greater detail below, the requisite proximity may be based upon a more restrictive or less restrictive degree of proximity. For example, in one embodiment, where the first and second user devices 202A and 202B are both smartphones, the requisite proximity may be achieved upon the first and second user devices 202A and 202B touching (e.g., by virtue of the user devices' respective near field communication (NFC) functionality, such as via Bluetooth® or WiFi). The proximity may be limited by a communication technology such as Wi-Fi or Bluetooth, or set by a system operator to be 20 feet for example. Moreover, proximity can be defined by either a media content service or service application, for example, a maximum distance between users when content recommendations are allowed and/or by a user of a device defining proximity as encompassing a group of subgroup of users, such as a school or classroom.

In accordance with some embodiments, the requisite proximity may be based upon solely temporal and geographic proximity rather than any signal exchange as in NFC communications. For example, sensors resident within each of the first and second user devices 202A and 202B may simply report their respective locations back to the central server 220. Content provider 212 may then recognize that first and second user devices 202A and 202B are co-located at the same point in time, and personalized content recommendations can be generated. Still other ways of determining proximity may include, for example, bio-sensing, such as voice recognition.

The aforementioned binding or pairing can occur over network 210, which provides connectivity between content provider 212 and the first and second user devices 202A and 202B, respectively. For example, content provider 212 may become aware that two users of its media service application are in close proximity to each other. Content provider 212 can allow the first and second users' media content libraries to be bound, which in turn allows for the combination of the first and second users' libraries to be the basis of one or more personalized content recommendations for the first and second user. Entitlement information may also then be shared by or between first and second user devices 202A and 202B. That is, entitlements normally associated with first user device 202A may also be provided to second user device 202B and vice versa, although this is optional, as the presentation of content selected from the personalized content recommendation(s) can occur through either first user device 202A or second user device 202B depending on which user owns/rents/subscribes to the selected content. For example, if the first user owns the selected content, the first user may be prompted on first user device 202A to begin playback on first user device 202A or cast the selected content onto a communal device, such as display 208C or some other user device, such as a set-top box connected to display 208C.

Once the first and second users are no longer proximate to one another, access to the second user's media content library by the first user and/or access to the first user's media content library by the second user can be denied. In terms of personalized content recommendations, alternative recommendations may be provided to any remaining users that are proximate to each other. Moreover, content selected from a personalized content recommendation and being presented may be halted. Alternatively, the user with whom media content was being shared may finish consumption of that particular media content, or the media content (which is, e.g., being streamed) may be substituted with an ad-supported version of the media content rather than an ad-free version. In such an instance, embedded timecodes within different versions of media content can be accessed and synchronized to allow an ad-supported version to continue playing from a point in time where the pairing is no longer valid or lost or to limit the ability of a user to replay or restart shared media content. In accordance with another embodiment, at the conclusion of a "paired session," the user consuming the shared media content may be presented with one or more options for purchasing or renting his/her own instance of the shared media content, related media content, etc. Still other constraints can be placed on the temporarily linked media content, such as limiting the number of shares, limiting the number of views, instituting a minimum geographical proximity, or other limitation or constraint.

It should be further noted that proximity can be periodically or aperiodically checked or verified depending on how strictly content provider 212 or a user wishes to control media content access. Additionally, the binding or pairing described herein can occur on varying levels. For example, and in accordance with one embodiment, users' media content libraries can be paired, whereas in accordance with another embodiment, pairing can occur on a user profile or account level. In accordance with still another embodiment, pairing can occur on a device level. Moreover, although various embodiments describe the binding or pairing of two user devices, profiles, media content libraries, etc., more than two user devices, profiles, media content libraries, etc., can be bound or paired.

Returning again to FIG. 1A, a recommendation regarding media content to consume based on one or more characteristics associated with at least one of the first and second user is provided at operation 102. That is, upon a determination that the first user and the second user are proximate to each other, at least one characteristic of the first user that relates to a characteristic of the second user is determined. For example, the first and second users of first user device 202A and second user device 202B, respectively, may have media content libraries with certain action movies in common, a certain genre of music in common, etc. One or more personalized content recommendations can be generated taking into account these one or more commonalities.

Figure 1B:
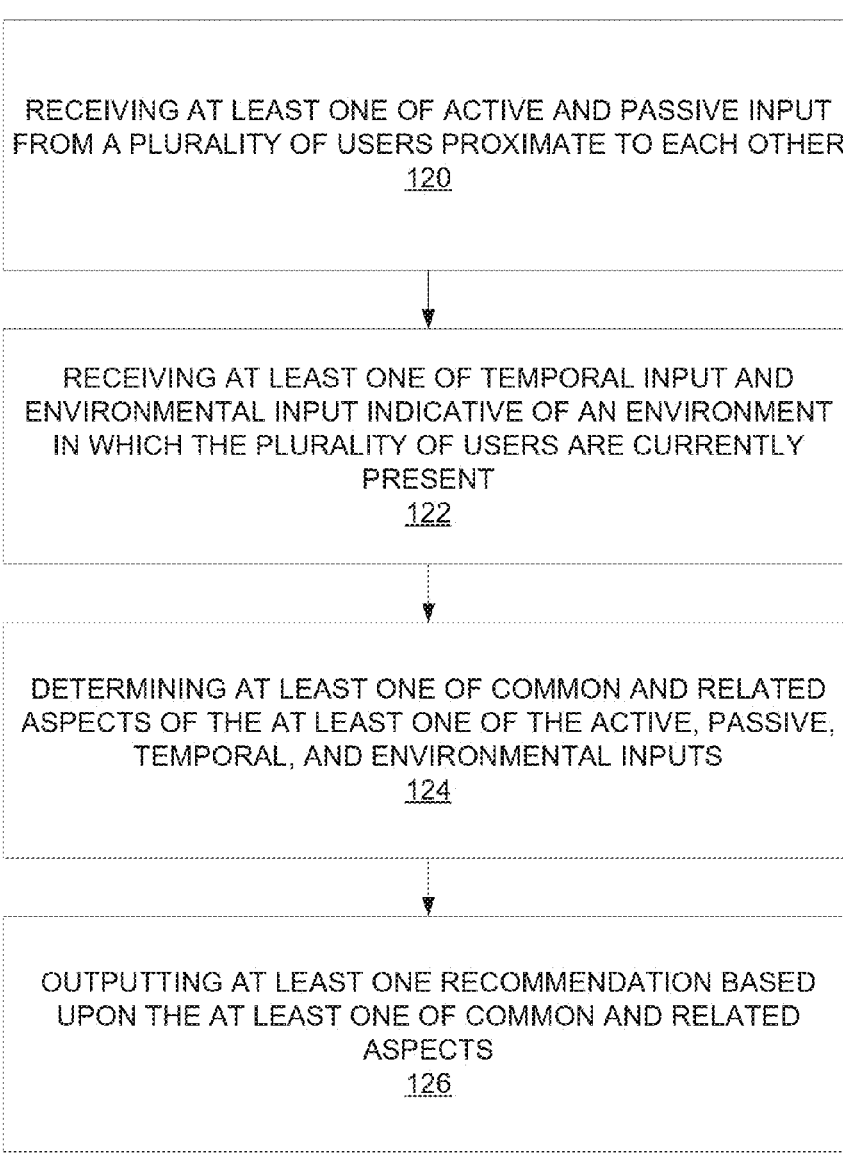
FIG. 1B is an operational flow diagram illustrating an example process for receiving inputs and generating outputs for personalized content recommendations in accordance with various embodiments.
Figure 2B:
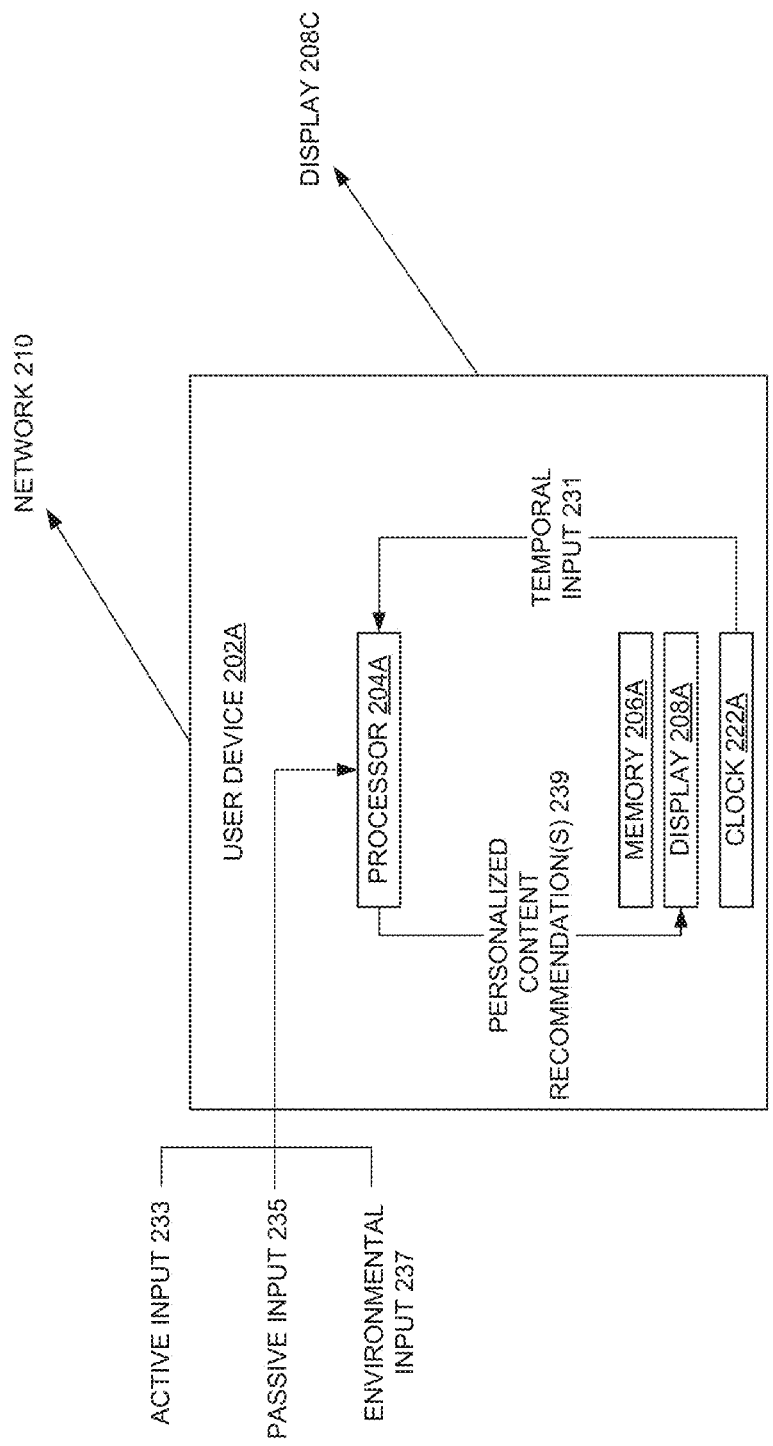
FIG. 2B illustrates an example user device utilized in providing personalized content recommendations in accordance with various embodiments.

FIGS. 1B and 2B will be discussed in conjunction with each other to more particularly describe the generation of the one or more personalized content recommendations provided at operation 104. At operation 120 of FIG. 1B, at least one of active and passive input from a plurality of users proximate to each other is received. One of the plurality of users may be the first user associated with first user device 202A (FIG. 2B).

Active input 233 can include one or more parameters or preferences input by the first user into a personalized content recommendations application or similarly configured user interface that can relay such active input to processor 204A. Such active input may comprise first user's interests, favorite actors/actresses, favorite content genre (e.g., action, sci-fi), thematic information and/or personalized playback lists for back-to-back playback of multiple contents over a certain time period or event, and the like.

Passive input 235 can include information regarding a user's purchased media content libraries, one or more parameters or preferences associated with the first user which a system can observe from the user's past content consumption history over a period of time, statistical analysis(es) of past content consumptions, or other relevant parameters or preferences associated with the first user, which are also input into processor 204A. In some instances, active input 233 and passive input 235 may include the same or similar parameters or preferences, differing only in the manner in which the input is received, i.e., whether from the first user or from analyzing information associated or relevant to the first user. It should be understood that both active and passive input can include exclusionary parameters or preferences, such as a preference for binding or pairing a particular subset of proximate users and/or undesired preferences or parameters.

It should be noted that FIG. 2B illustrates an embodiment whereby first user device 202A receives such input, but in accordance with other embodiments, it may be central server 220 and/or content provider 212 that receives the input. In accordance with another embodiment, it may be second user device 202B that receives the input. For example, between first user device 202A and second user device 202B, receipt of the input and subsequent generation of personalized content recommendations can occur based upon a random selection of which user device controls, some predetermined order, and/or based upon characteristics of the user devices. That is, considering that first user device 202A may be a smart phone, and second user device 202B may be a laptop computer, second user device 202B presumably has one or more characteristics making it more suitable for receiving and processing input(s) to generate personalized content recommendations. For example, second user device 202B may have a larger display size, longer battery life, more memory capacity, and greater processing speed or power. However, first user device 202A may have more connectivity options allowing it to connect to network 210, which may be one deciding factor in determining which of a plurality of user devices should receive input and/or generate personalized content recommendations. Other factors can include connection speed, bandwidth, and/or cost, memory capacity, and the like.

Thus far, embodiments of the present disclosure have been described in the context of provider-specific media content services or applications. However, personalized content recommendations need not be limited to that context. For example, depending on which people/users are proximate to each other, movie recommendations at one or more nearby movie theaters (using position location to find nearest theaters) or in a home can be provided. That is, if a determination is made that the first user is proximate to the second user, the first and second users being spouses, recommended movies to watch may include romantic comedies. However, if the first user and second user that are proximate to each other are a parent and child, user preferences, past content consumption, etc. may be used to generate movie recommendations geared towards G or PG-rated movies.

At operation 122 (FIG. 1B), at least one of temporal input and environmental input indicative of an environment in which the plurality of users are currently present. For example, processor 204A of first user device 202A may receive temporal input from an internal clock 222A (or alternatively from a clock of another device, such as second user device 202B, display 208C). Time of day can be used, like the aforementioned active and passive inputs, as one factor in determining what content to present in a personalized content recommendation. Following the above example of providing personalized content recommendations at home, time of day can be used as a predictive factor, where content suggested in personalized content recommendations may change based on the current time of day. For example, it may be determined from statistical analyses of users' historical content consumption that content geared towards children cease at 8 pm on weeknights and 10 pm on weekend evenings, suggesting that these times are bedtimes for the children in a particular household. Accordingly, personalized content recommendations provided prior to those times may be geared towards content appropriate for younger consumers, while personalized content recommendations provided after those times may be geared towards content appropriate for adult consumers.

Time or duration can be also be taken into account with respect to content consumption patterns, (which may be one form of passive input 235). For example, content consumption history may show a pattern of brief periods of content consumption in the morning involving children's television. This may be indicative of a morning ride to school in which children tend to view short TV show episodes. Accordingly, personalized content recommendations in such situations can be tailored to appropriate content for consumption based on the proximate users as well as the time typically available to consume content.

With regard to environmental input 237 of FIG. 2B, processor 204A can receive input indicative of the environmental characteristics currently present relative to the plurality of users. For example, a plurality of users may be involved in an exercise class. Based on the aforementioned active, passive, and/or temporal inputs, one or more personalized content recommendations can be provided to one or more of the plurality of users. Considering that the plurality of users may transition from one type of exercise equipment, such as an elliptical exerciser to weight-lifting equipment, content suggested in the one or more personalized content recommendations can adapt. When the plurality of users is engaged in exercise activity using elliptical exercisers, the personalized content recommendations may be limited to music or audio-based content given that the elliptical movement may not be conducive to viewing visual content, whereas when the plurality of users is engaged in weight-lifting, recommended content may include visual content.

At operation 124 (FIG. 1B), at least one of common and related aspects of the at least one of the active, passive, temporal, and environmental inputs is determined. That is, any or all relevant inputs, preferences, parameters, exclusions, etc. contemplated herein may be analyzed for common or related aspects between the media content libraries of the plurality of users. It should be noted that one or more various algorithms and/or processing mechanisms can be utilized to arrive at one or more personalized content recommendations. For example, different weights may be assigned to different common or related aspects, where content having greater commonality may be given greater priority in one or more personalized content recommendations over content having less commonality.

At operation 126 (FIG. 1B), at least one recommendation based upon the at least one of the common and related aspects is output. In FIG. 2B, a personalized content recommendation(s) 239 is shown as being output to display 208A of first user device 202A. It should be understood that the personalized content recommendation(s) 239 can be output to other user devices as well, such as each user device associated with the plurality of users whose media content libraries have been paired or bound and used to generate the personalized content recommendation(s) 239, and/or to a communal device, such as display 208C.

Figure 2C:
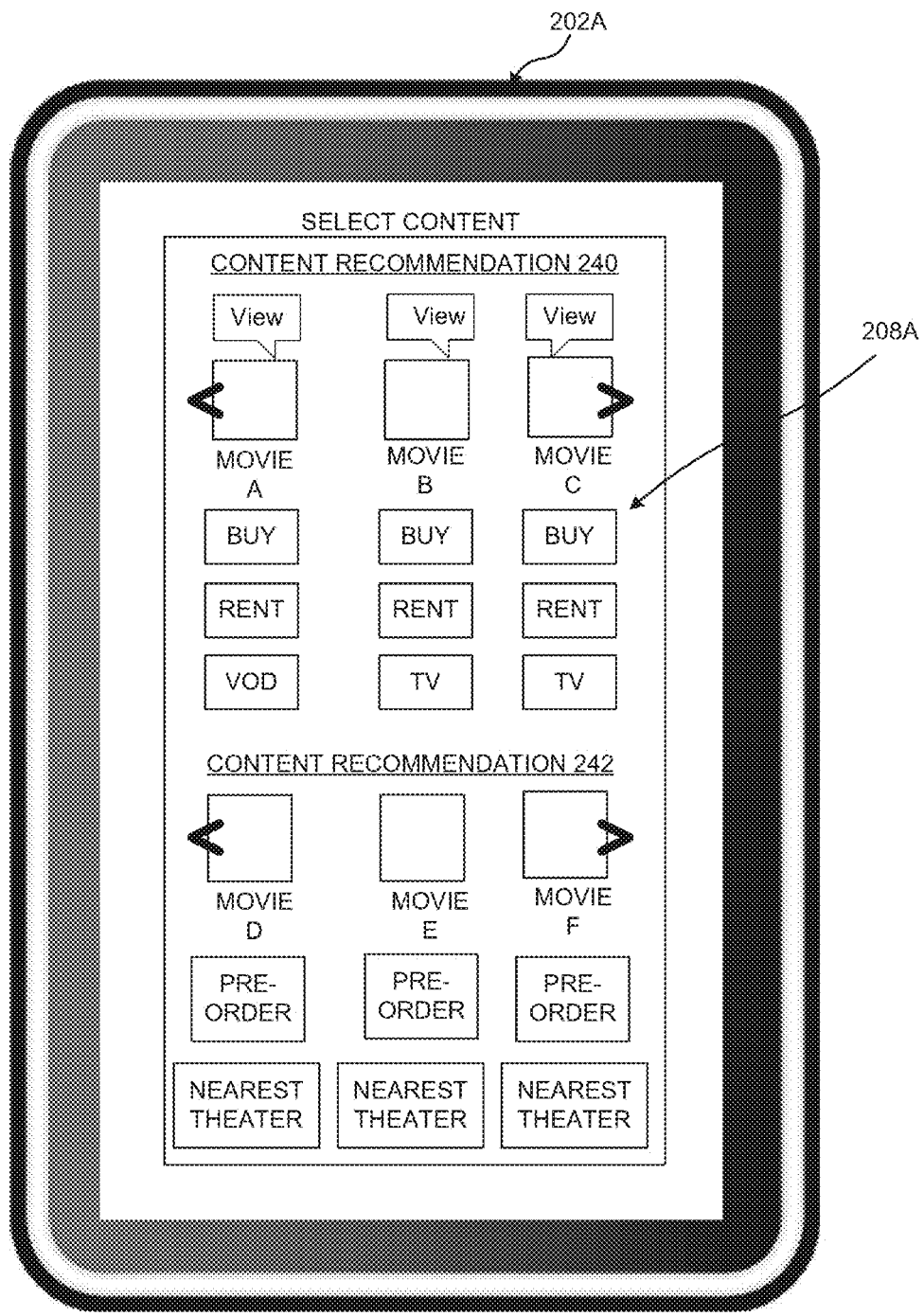
FIG. 2C illustrates an example GUI used for presenting and/or interacting with personalized content recommendations in accordance with various embodiments.

FIG. 2C illustrates an example GUI that may be presented to one or more users reflecting one or more personalized content recommendations in accordance with various embodiments. FIG. 2C illustrates first user device 202A, which in this example may be a tablet PC. Display 208A may present the GUI within a dedicated personalized content recommendations application, an existing media application, a dedicated media player, etc. The GUI can present one or more options regarding content commensurate with one or more personalized content recommendations. Options can be provided to view information about each recommendation (such as duration of a movie, actors/actresses, director), view visual representations, consume clips, as well as engage in transactions for that most popular content. In the example illustrated in FIG. 2C, content recommendation 240 includes at least movies A, B, and C. Options are presented to allow the first user of first user device 202A to view movies A, B, and C. Viewing movies A, B, and C may entail immediately presenting a movie on display 208A if the user has a previously-purchased license or entitlement to watch the movie, or casting the movies onto one or more different user devices. Additional options exist for the first user to buy or rent movies A, B, and C on one or more platforms (a user can select amoung a plurality of platforms or services). Additionally, considering movies A, B, and C may have been released on channels, after their theatrical release, processor 204A (FIG. 2A, 2B) for example, may search channels for broadcast times and/or video-on-demand (VOD) viewing options and present such options when available. It should be understood that the term "channel" in this context is not limited to TV broadcast channels, but refers generally to any communication media or connection(s) capable of presenting media content. Content recommendations 242 include movies D, E, and F, which may currently be in theatrical release only. In this case, the GUI can present options to pre-order the movie when it is later released on DVD or Blu-Ray or a digital stream or download, for example, and/or present options (such as show times) for viewing at the nearest movie theater. In the case of transactions, a direct link to a transactional portal that allows the first user to purchase, rent, or otherwise obtain the right/entitlement to consume that most popular media content from the second user (or an account to access content associated with the second user) may be provided. Alternatively, the GUI can be redirected to a resident web browser and the requisite content provider can be contacted for transaction processing. It should further be noted that transactions can occur on any available platform provided by one or more content providers, third-party content providers, distributors, retailers, etc.

Figure 3:
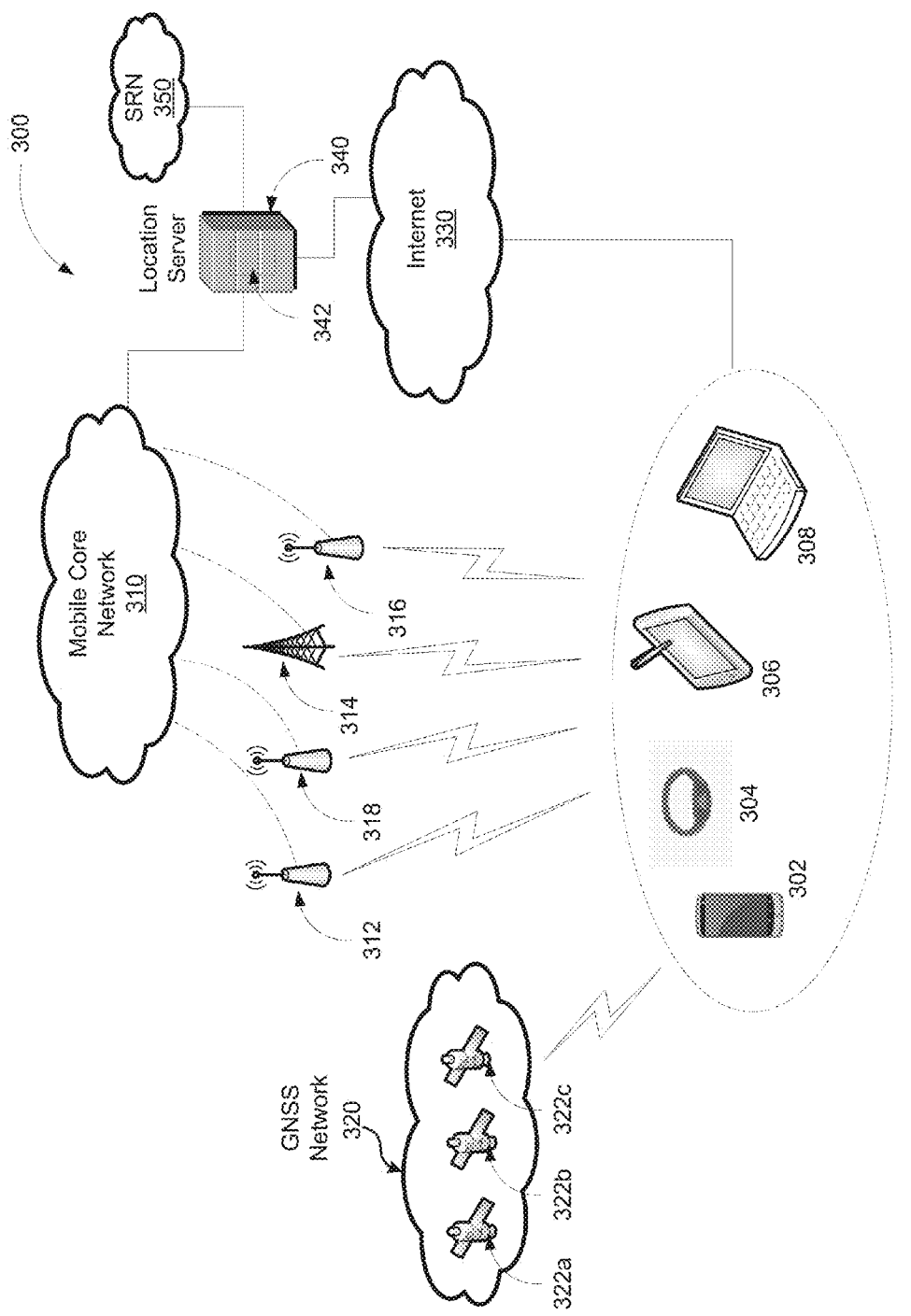
FIG. 3 illustrates an example communications system with which various embodiments may be implemented.

As described previously, various embodiments of generating and outputting one or more personalized content recommendations involves determining proximity, location, environmental conditions, etc. FIG. 3 is a block diagram illustrating an example communication system 300 in which various embodiments may be implemented in accordance with the present disclosure for achieving such location-based aspects of the various embodiments. Communications system 300 may include a plurality of mobile devices, of which mobile devices 302-308 (one or more of which may be example embodiments of user devices 202A and 202B of FIG. 2A) are illustrated. Example mobile devices may include a smart phone 302, an identification device, such as an NFC ID band 304, a tablet PC 306, and/or a laptop PC 308. Also shown in communication system 300 is a mobile core network 310, a wireless access point (AP) 312, a cellular base station (BS) 314, a Bluetooth® emitter 316, an NFC terminal 318, a global navigation satellite system (GNSS) network 320, a plurality of GNSS satellites 322a-322n, an internet 330, a location server 340, and a satellite reference network (SRN) 350. One or more of mobile core network 310, wireless AP 312, cellular BS 314, Bluetooth® emitter 316, NFC terminal 318, GNSS network 320, GNSS satellites 322a-322n, internet 330, location server 340, and/or satellite reference network (SRN) 350 can be used to determine the location of one or more of the mobile devices 302-308 and/or for determining the location of at least one user relative to another user. One or more or all of the networks illustrated in FIG. 3 may be an embodiment of network 210 of FIG. 2A or may be additional networks over which the various elements of FIG. 2A may communicate and/or interact.

Wireless AP 312 may include suitable logic, circuitry, interfaces, and/or code that are operable to provide data services to communication devices, such as one or more of the mobile devices 302-308, in adherence with one or more wireless LAN (WLAN) standards such as, for example, IEEE 802.11, 802.11a, 802.11b, 802.11d, 802.11e, 802.11n, 802.11 ac, 802.11v, and/or 802.11u. Wireless AP 312 may communicate with mobile core network 310 and/or internet 330, via one or more links and/or associated devices for example. In this manner, wireless AP 312 may provide network access to mobile devices 302-308.

Cellular BS 314 may include suitable logic, circuitry, interfaces, and/or code that are operable to provide voice and/or data services to communication devices, such as one or more of the mobile devices 302-308, in adherence with one or more cellular communication standards. Exemplary cellular communication standards may include Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). Cellular BS 314 may communicate with mobile core network 310 and/or internet 330, via one or more backhaul links and/or associated devices for example. In this manner, cellular BS 314 may provide network access to mobile devices 302-308, enabling a mobile device, such as smart phone 302, to communicate with one or more databases, services, servers, networks, or interactive media walls as described herein.

Bluetooth® emitter 316 may include suitable logic, circuitry, interfaces, and/or code that are operable to provide Bluetooth® based connectivity to communication devices, such as one or more of mobile devices 302-308, in adherence with various Bluetooth® and/or Bluetooth® Low Energy (BLE) standards. Bluetooth® emitter 316 may communicate with mobile core network 310 and/or internet 330, via one or more backhaul links and/or associated devices for example. In this manner, Bluetooth® emitter 316 may provide network access to mobile devices 302-308, enabling a mobile device, such as smart phone 302 to communicate with one or more entities of system 300.

NFC terminal 318 may include suitable logic, circuitry, interfaces, and/or code that can provide NFC-based connectivity to communication devices, such as one or more of the mobile devices 302-308, in adherence with various short range communication standards such as the Near Field Communications standards. The NFC terminal 318 may communicate with the mobile core network 310 and/or the internet 330, via one or more backhaul links and/or associated devices for example. In this manner, the NFC terminal 318 may provide network access to the mobile devices 302-308. Alternatively, NFC functionality may be resident within each of the mobile devices 302-308.

Mobile core network 310 may include suitable logic, circuitry, interfaces, and/or code that are operable to provide interfacing and/or connectivity servicing between access networks, which may be utilized by the mobile devices 302-308, and external data networks such as packet data networks (PDNs) and/or internet 330. Mobile core network 310 may correspond to one or more service providers that provide, control, and/or manage network accessibility available via mobile devices 302-308. In this regard, mobile devices 302-308 may access the mobile core network 310 via wireless AP 312, cellular BS 314, Bluetooth® emitter 316, and/or NFC terminal 318. Mobile core network 310 may communicate various data services, which are provided by external data networks, to associated user devices such as, for example, mobile devices 302-308. In an example aspect of the disclosure, mobile core network 310 may be operable to communicate with location server 340 to obtain location information that can be used to ascertain the relative locations of mobile devices 302-308.

Each of mobile devices 302-308 may include suitable logic, circuitry, interfaces, and/or code for implementing various aspects of the embodiments disclosed herein. In this regard, each of mobile devices 302-308 may be operable to communicate via a plurality of wired and/or wireless connections. Each of mobile devices 302-308 may be operable, for example, to transmit to and/or receive signals from one or more of wireless AP 312, cellular BS 314, Bluetooth® emitter 316, NFC terminal 318, GNSS network 320, and/or internet 330. Also, each of mobile devices 302-308 may be operable to communicate with, and/or receive services provided by internet 330 and/or mobile core network 310.

GNSS network 320 may include suitable logic, circuitry, interfaces, and/or code that may provide navigation information to land-based devices via satellite links. In this regard, GNSS network 320 may include, for example, a plurality of GNSS satellites 322a-322n, each of which is operable to provide satellite transmissions based on a GNSS, enabling land-based devices, such as the mobile devices 302-308, to determine their locations. SRN 350 may include suitable logic, circuitry, interfaces, and/or code that are operable to collect and/or distribute data for GNSS satellites on a continuous basis. SRN 350 may include a plurality of GNSS reference tracking stations located around the world to provide A-GNSS coverage all the time in both a home network and/or any visited network.

Location server 340 may include suitable logic, circuitry, interfaces, and/or code that are operable to provide and/or support location based services. In this regard, location server 340 may be operable to store and/or process location related information pertaining to communication devices in system 300, such as one or more of mobile devices 302-308, as well as the location of other entities, such as points of interest, merchants, etc. It should be noted that location server 340 may access and/or communicate with other location servers/services (not shown) for the purpose of associating a location of communication devices in system 300 with known locations of other entities, points of interest, etc. The location information may be stored in a location reference database 342 in location server 340. Location server 340 may be operable to collect and/or retrieve location information from communication devices. Location server 340 may communicate the stored location data when requested to do so.

In operation, location server 340 may maintain, for example, location reference database 342, which may include elements corresponding to each of mobile devices 302-308. Location server 340 may access SRN 350 to collect GNSS satellite data, and may utilize the collected GNSS satellite data to generate GNSS assistance data (A-GNSS data) pertaining to the mobile devices 302-308. Location server 340 may also collect and/or retrieve location information directly from mobile devices 302-308, and/or from other associated entities that interact with mobile devices 302-308 in system 300, such as, for example, wireless AP 312, cellular BS 314, Bluetooth® emitter 316, and/or NFC terminal 318. The retrieved location information may be stored in location reference database 342 in location server 340. Location server 340 may communicate the stored location data, e.g., when requested to do so. Location reference database 342, maintained in location server 340, may be modified, refined, and/or updated using retrieved location information. Location information stored and/or maintained by location server 340 may be utilized to augment and/or substitute for location information received and/or generated based on communication with GNSS network 320, for example, when communication with GNSS network 320 is disturbed.

The location data may also be locally generated, and/or maintained thereafter by devices and/or entities other than location server 340. In this regard, location related data, which typically may be generated and/or maintained by location server 340, may be locally generated, maintained, and/or used by mobile devices 302-308, and/or by service providers thereof. Accordingly, devices and/or entities that typically may be serviced by location server 340, such as mobile devices 302-308, may also perform location related servicing locally. Furthermore, locally generated and/or maintained location related data may be uploaded from mobile devices 302-308, and/or service providers thereof, to location server 340. Uploading the location related data may be performed periodically, on request, and/or based on the configuration of the client devices or entities, and/or location server 340 itself.

It should be noted that the example embodiments described herein are not limiting, and the systems and methods of providing personalized content recommendations set forth in the present disclosure can be applied to many different scenarios. For example, personalized content recommendations as described herein can be leveraged to present targeted advertising or content to shoppers in a mall through kiosks, digital photo frames, targeted content while waiting in queues, etc. Furthermore, the presentation of personalized content recommendations can involve the creation of short-form content, such as trailers. For example, upon detecting the physical proximity of a first user device and a second user device, a system may select one or more movies and select certain scenes of the movie(s) based on the users' preferences (e.g., action movies, comedies, certain actors/actresses), interests (e.g., sports, hobbies), and the like to create one or more short videos, such as teasers or trailers, to show to the first and second users. Referring back to FIG. 2C, the view option may be, in some embodiments, the presentation of such short-form trailers or other derivative content. For example, if two users who like action movies and a certain actor bring their user devices within a proximity to each other, the system may select action scenes of a movie and/or scenes with that actor and compile the selected scenes in a 2-minute video to show to the two users. Moreover, the TV option illustrated in FIG. 2C, may in other embodiments, reflect a personalized TV guide that can be an aggregation of sources (channels, content provider platforms, physical media) and/or recommended viewing times.

It should also be noted that previously presented content recommendations can be stored in a memory, such as memory 206A (FIG. 2B) or within a database (not shown) associated with central server 220 or content provider 212 (FIG. 1A). In this way, inputs can be tracked on a group level, and the same or alternative personalized content recommendations can be given, for example, the next time the same or similar group of users are determined to be proximate to each other. Content discovery can be achieved by leveraging previously presented content recommendations in combination with, e.g., newly obtained content, by one or more users in the group.

Figure 4:
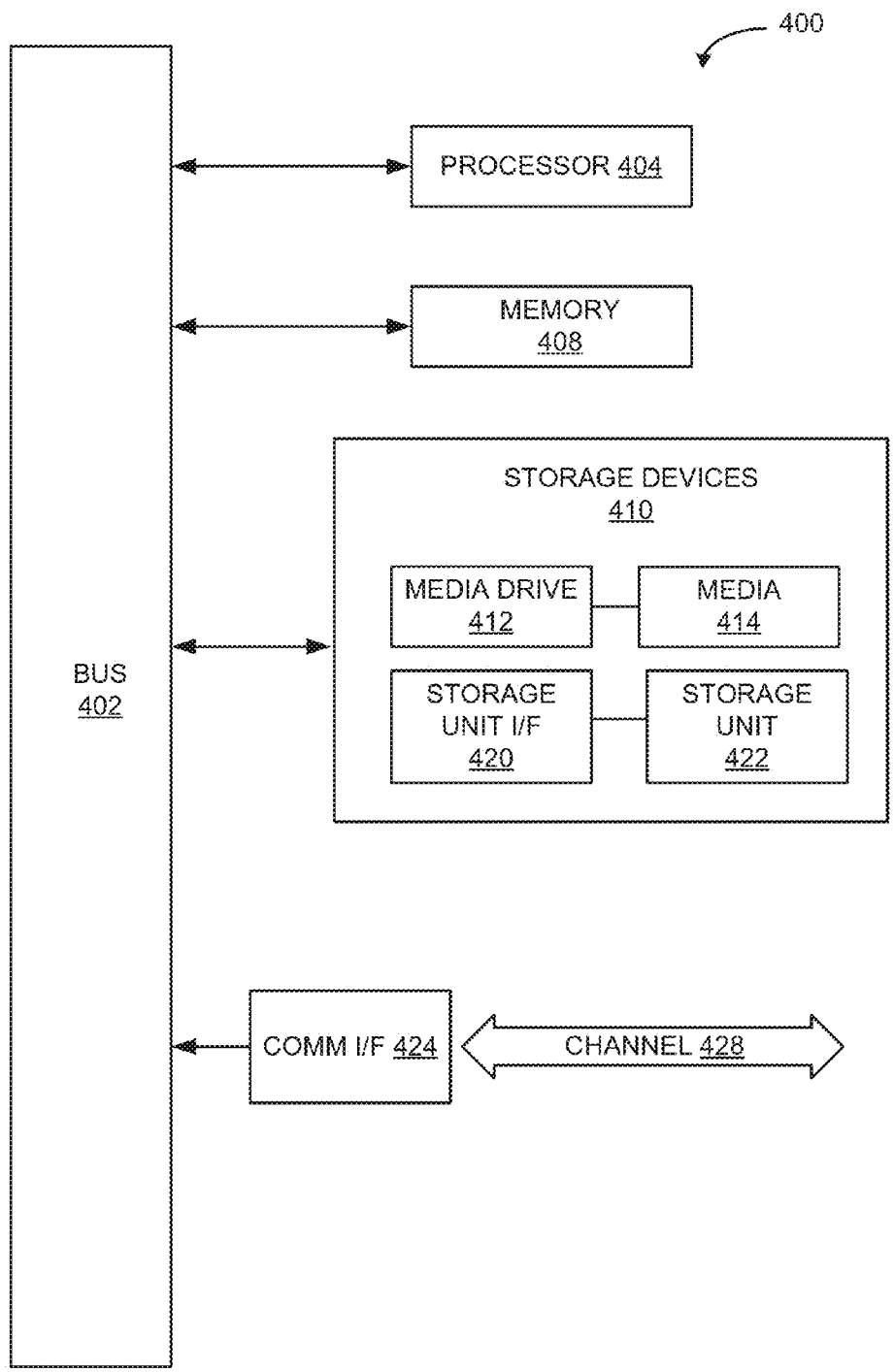
FIG. 4 is an example computing module that may be used to implement various features of embodiments described in the present disclosure.

FIG. 4 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 400. After reading this description, it will become apparent to a person skilled in the relevant art how to implement the application using other computing modules or architectures.

Referring now to FIG. 4, computing module 400 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example navigation systems, portable computing devices, and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 414 might include, for example, a hard disk, an integrated circuit assembly, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment.

Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
    determining a first location of a first user device associated with a first user;
    determining a second location of a second user device associated with a second user;
    determining whether the first location of the first user device is proximate to the second location of the second user device;
    upon a determination that the first and second locations are proximate to each other, binding one or more media content-related characteristics regarding the first and second users;
    determining a relationship between the first and second users based upon the one or more media content-related characteristics; and
    without first or second user input regarding user content preferences, providing a recommendation of media content to consume based upon the determined relationship.

2. The computer-implemented method of claim 1, wherein the one or more media content-related characteristics comprises at least one of personal characteristics and historical content-consumption characteristics.

3. The computer-implemented method of claim 1, wherein determining the relationship between the first and second users comprises comparing respective media content libraries of the first user and the second user to determine common media content between the respective content libraries, and wherein the recommendation comprises the common media content.

4. The computer-implemented method of claim 3, wherein the comparing of the respective media content libraries of the first and second users occurs at one of a user account level, a media service application level, and a user device level.

5. The computer-implemented method of claim 1, further comprising determining at least one active, passive, environmental and temporal aspects currently associated with the first and second users.

6. The computer-implemented method of claim 1, wherein determining whether the first location of the first user device is proximate to the second location of the second user device comprises determining the first and second user devices' respective locations using at least one of location-based services and near field communication (NFC) services.

7. The computer-implemented method of claim 6, wherein the NFC services comprises a discovery protocol through which at least one of the first or second user devices broadcasts an identifier and at least one of the other of the first or second user devices scans for the identifier.

8. The computer-implemented method of claim 1, wherein the recommendation is temporary and dynamically based upon continuing proximity of the first and second user devices and rights associated with at least one of the first and second users to consume the selected media content.

9. The computer-implemented method of claim 1, further comprising allowing the first user to select a presentation of media content from one or more media content indicated in the recommendation, and presenting the selected media content on at least one of the first and second user devices associated with at least one of the first and second user having rights to consume the selected media content.

10. The computer-implemented method of claim 9, wherein the presentation of media content selected from one or more media content indicated in the recommendation comprises casting the selected media content to at least one of the first and second user devices and a communal presentation device proximate to the first and second users.

11. The computer-implemented method of claim 1, further comprising providing a temporary grant or exchange of one or more entitlements associated with the one or more media contents indicated in the recommendation from the first user to the second user.

12. The computer-implemented method of claim 1, wherein the recommendation comprises at least one of a listing of one or more media contents, options to at least one buy, rent, and pre-order the one or more media contents, a suggested venue at which to consume the one or more media contents, a derivative media content based on the one or more media contents, and at least one of times and media channels when and through which the one or more media contents are to be consumed.

13. The computer-implemented method of claim 1, further comprising using the one or more media content-related characteristics of the first and second users to select scenes of a movie to show as a trailer to the first and second users.

14. An apparatus, comprising:
a processor; and
a memory unit operatively connected to the processor including computer code adapted to cause the processor to:
receive at least one of active and passive input from a plurality of users proximate to each other, active and passive input comprising one or more media content-related user preferences and historical content consumption information;
receive temporal input indicative of a current time and environmental input indicative of an environment in which the plurality of users are currently present;
determine at least one of common and related aspects of the at least one of the active and passive inputs, and the temporal and environmental inputs relative to one or more media contents comprising respective media libraries of each of the plurality of users; and
output at least one recommendation for the one or more media contents based upon the at least one of common and related aspects.

15. The apparatus of claim 14, wherein the active input comprises one or more media content-related parameters or preferences associated with one or more of the plurality of users input by the user.

16. The apparatus of claim 14, wherein the passive input comprises one or more media content-related parameters or preferences associated with one or more of the plurality of users determined by analyzing at least one of current and historical media content-related activities engaged in by one or more of the plurality of users.

17. The apparatus of claim 14, wherein the temporal input comprises at least one of a current time at which the one or more recommended media contents are to be consumed and a duration over which the one or more recommended media contents are to be consumed.

18. The apparatus of claim 14, wherein the one or more recommended media contents are prioritized based upon weights applied to the at least one of common and related aspects.

19. The apparatus of claim 14, wherein the computer code adapted to cause the processor to output the at least one recommendation further causes the processor to adjust the at least one recommendation or output at least one alternative recommendation upon one or more of the plurality of users departing a predetermined area of proximity in which the plurality of users are currently located, or upon entry of another user into the predetermined area of proximity.

20. The apparatus of claim 14, wherein the at least one recommendation comprises at least one of a listing of the one or more media contents, options to at least one of buy, rent, and pre-order the one or more media contents, a suggested venue at which to consume the one or more media contents, a derivative media content based on the one or more media contents, and at least one of times and media channels when and through which the one or more media contents are to be consumed.

* * * * *